United States Patent
Kim et al.

(10) Patent No.: US 9,296,427 B1
(45) Date of Patent: Mar. 29, 2016

(54) VEHICLES INCLUDING TARGETED ENERGY ABSORPTION STRUCTURES

(71) Applicants: Toyota Motor Engineering & Manufacturing North America, Inc., Erlanger, KY (US); Toyota Jidosha Kabushiki Kaisha, Toyota (JP)

(72) Inventors: John P. Kim, Ann Arbor, MI (US); Jonathan R. Young, Saline, MI (US); Palani Palaniappan, Ann Arbor, MI (US); Toshiyuki Kasai, Toyota (JP); Masahiro Onoda, Toyota (JP); Shinpei Matsumoto, Toyota (JP)

(73) Assignees: Toyota Motor Engineering & Manufacturing North America, Inc., Erlanger, KY (US); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/478,359

(22) Filed: Sep. 5, 2014

(51) Int. Cl.
*B62D 21/15* (2006.01)
*B62D 24/00* (2006.01)

(52) U.S. Cl.
CPC .............. *B62D 21/152* (2013.01); *B62D 24/00* (2013.01)

(58) Field of Classification Search
CPC ...... B62D 21/11; B62D 21/15; B62D 21/152; B62D 21/155; B62D 21/157; B62D 24/00
USPC ....................................... 280/784; 296/187.1
See application file for complete search history.

(56) References Cited

U.S. PATENT DOCUMENTS

| | | | | | |
|---|---|---|---|---|---|
| 2,136,122 | A | * | 11/1938 | Almdale | 280/797 |
| 3,881,742 | A | * | 5/1975 | Felzer | 280/784 |
| 4,413,840 | A | * | 11/1983 | Shah | 280/784 |
| 4,848,835 | A | * | 7/1989 | DeRees | 296/204 |
| 5,275,436 | A | * | 1/1994 | Pomero | 280/784 |
| 5,685,599 | A | * | 11/1997 | Kitagawa | 296/204 |
| 6,053,564 | A | * | 4/2000 | Kamata et al. | 296/187.09 |
| 6,361,102 | B1 | * | 3/2002 | Han | 296/203.02 |
| 6,364,358 | B1 | * | 4/2002 | Miller | 280/784 |
| 6,428,085 | B1 | * | 8/2002 | Miyasaka et al. | 296/187.12 |
| 6,460,889 | B2 | * | 10/2002 | Iyanagi et al. | 280/784 |
| 6,511,119 | B2 | | 1/2003 | Takase et al. | |
| 6,547,318 | B2 | * | 4/2003 | Takeuchi | 296/204 |
| 6,655,728 | B2 | * | 12/2003 | Sano et al. | 296/187.09 |
| 6,733,040 | B1 | * | 5/2004 | Simboli | 280/800 |
| 6,866,115 | B2 | * | 3/2005 | Miyasaka | 180/311 |
| 6,916,063 | B2 | * | 7/2005 | Song | 296/203.02 |
| 6,929,314 | B2 | * | 8/2005 | Hanyu | 296/203.02 |
| 6,957,846 | B2 | | 10/2005 | Sacki | |
| 7,219,954 | B2 | | 5/2007 | Gomi et al. | |
| 7,243,981 | B2 | | 7/2007 | Park et al. | |

(Continued)

*Primary Examiner* — Laura Freedman
(74) *Attorney, Agent, or Firm* — Dinsmore & Shohl LLP

(57) ABSTRACT

Vehicle structures for dissipating energy associated with a collision are disclosed herein. In one embodiment, a vehicle includes a side support that extends between a front suspension mount and a rear suspension mount of the vehicle. The side support includes a targeted energy absorption portion that defines a high-strength region of the side support. The vehicle also includes a cab mounting bracket coupled to the side support and extending outward from the side support. The cab mounting bracket includes a rearward attachment position on the side support and the rearward attachment position of the cab mounting bracket is positioned proximate to the high-strength region of the side support. The vehicle further includes a wheel assembly that is coupled to the front suspension mount and is positioned forward of the cab mounting bracket in a vehicle longitudinal direction.

20 Claims, 12 Drawing Sheets

(56) References Cited

U.S. PATENT DOCUMENTS

| | | | |
|---|---|---|---|
| 7,578,545 B2 * | 8/2009 | Fujikawa | 296/187.09 |
| 7,673,904 B2 * | 3/2010 | Harada et al. | 280/782 |
| 8,141,904 B2 * | 3/2012 | Akaki et al. | 280/784 |
| 8,454,080 B2 | 6/2013 | Qu et al. | |
| 8,562,021 B1 * | 10/2013 | Kuwabara et al. | 280/784 |
| 8,585,134 B2 * | 11/2013 | Yasui et al. | 296/209 |
| 8,807,597 B2 * | 8/2014 | Akaki et al. | 280/784 |
| 8,888,168 B2 * | 11/2014 | Kuwabara et al. | 296/187.09 |
| 8,939,496 B2 * | 1/2015 | Obayashi et al. | 296/187.08 |
| 8,985,258 B1 * | 3/2015 | Midoun et al. | 180/274 |
| 2013/0270863 A1 | 10/2013 | Young et al. | |
| 2013/0320709 A1 | 12/2013 | Kuwabara et al. | |
| 2013/0341969 A1 | 12/2013 | Fujii et al. | |

* cited by examiner

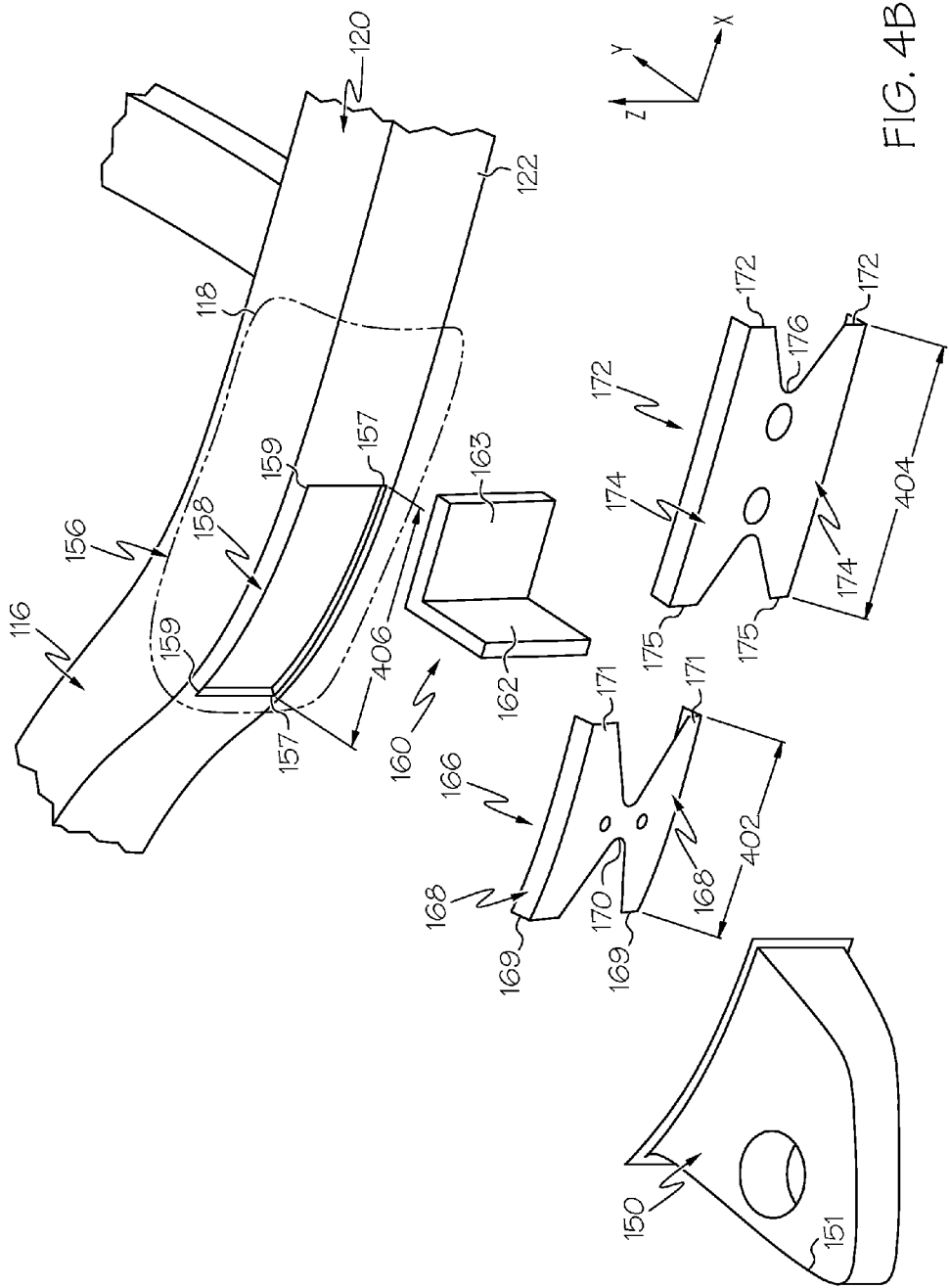

VEHICLES INCLUDING TARGETED ENERGY ABSORPTION STRUCTURES

TECHNICAL FIELD

The present specification generally relates to vehicles including energy absorption structures and, more specifically, to vehicles including side rails with targeted energy absorption portions.

BACKGROUND

Vehicles may be equipped with bumper systems and crash protection structures that plastically deform to absorb energy in the event of a crash. When a vehicle impacts or is impacted by an object that is offset from the centerline of the vehicle such that the object overlaps a portion of the bumper, the ability of the energy absorbing structure of the vehicle to absorb energy associated with the impact may be reduced. In some impact configurations, the energy absorbing structure of the vehicle may not be activated or may only partially activated because the object does not come into contact with or only partially comes into contact with the associated bumper or vehicle structure. Therefore, the bumper and the energy absorbing structure of the vehicle may have a reduced effect on the dissipation of the energy of the impact. Instead, the energy from the impact may be directed into various vehicle structures, including suspension units of the vehicle.

In one example, a substantial portion of energy from an impact with a small front bumper overlap may be directed into a front wheel, which causes the front wheel to be directed in a generally rearward direction. The energy may be transferred rearward along the vehicle towards as the front wheel contacts vehicle structures proximate to a passenger cabin of the vehicle.

Accordingly, a need exists for alternative structures for transferring energy and absorbing energy from a small front bumper overlap collision.

SUMMARY

In one embodiment, a vehicle includes a side support that extends in a vehicle longitudinal direction between a front suspension mount and a rear suspension mount of the vehicle. The side support includes a targeted energy absorption portion that is positioned between the front suspension mount and the rear suspension mount of the vehicle. The targeted energy absorption portion defines a high-strength region of the side support. The vehicle also includes a cab mounting bracket that is coupled to the side support and extends outward in a vehicle lateral direction from the side support. The cab mounting bracket includes a rearward attachment position on the side support, and the rearward attachment position of the cab mounting bracket is positioned proximate to the high-strength region of the side support. The vehicle further includes a wheel assembly that is coupled to the front suspension mount and is positioned forward of the cab mounting bracket in the vehicle longitudinal direction.

In another embodiment, a vehicle includes a side support that extends in a vehicle longitudinal direction between a front suspension mount and a rear suspension mount of the vehicle, the side support including a targeted energy absorption portion that is positioned between the front suspension mount and the rear suspension mount of the vehicle, in which the targeted energy absorption portion defines a high-strength region of the side support. The vehicle also includes a front suspension unit that is coupled to the front suspension mount, in which the front suspension unit including a rim having an inner flange and an outer flange opposing the inner flange and a centerline positioned between the inner flange and the outer flange bisecting the rim. The vehicle further includes a cab mounting bracket coupled to the side support in which the cab mounting bracket extends outward from the side support in a vehicle lateral direction such that at least a portion of the cab mounting bracket extends beyond the centerline of the rim in the vehicle lateral direction, and the cab mounting bracket includes a rearward attachment position on the side support. The rearward attachment position of the cab mounting bracket is positioned proximate to the high-strength region of the side support. The rim of the front suspension unit is positioned forward of the cab mounting bracket in the vehicle longitudinal direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4B schematically depicts an exploded view of a targeted energy absorption portion according to one or more of the embodiments shown or described herein;

DETAILED DESCRIPTION

Vehicle structures for directing and dissipating energy in the event of a small front bumper overlap collision are disclosed herein. A vehicle may include a side support that extends in a vehicle longitudinal direction between a front suspension mount and a rear suspension mount of the vehicle. The side support may include a targeted energy absorption portion that is positioned between the front suspension mount and the rear suspension mount of the vehicle, where the targeted energy absorption portion defines a high-strength region of the side support. The vehicle may also include a cab mounting bracket that is coupled to the side support and extends outward in a vehicle lateral direction from the side support. The cab mounting bracket includes a rearward attachment position that is positioned proximate to the high-strength region of the side support. Various embodiments of vehicle structures for dissipating energy of a small front bumper overlap collision are described in detail below.

Figure 1:
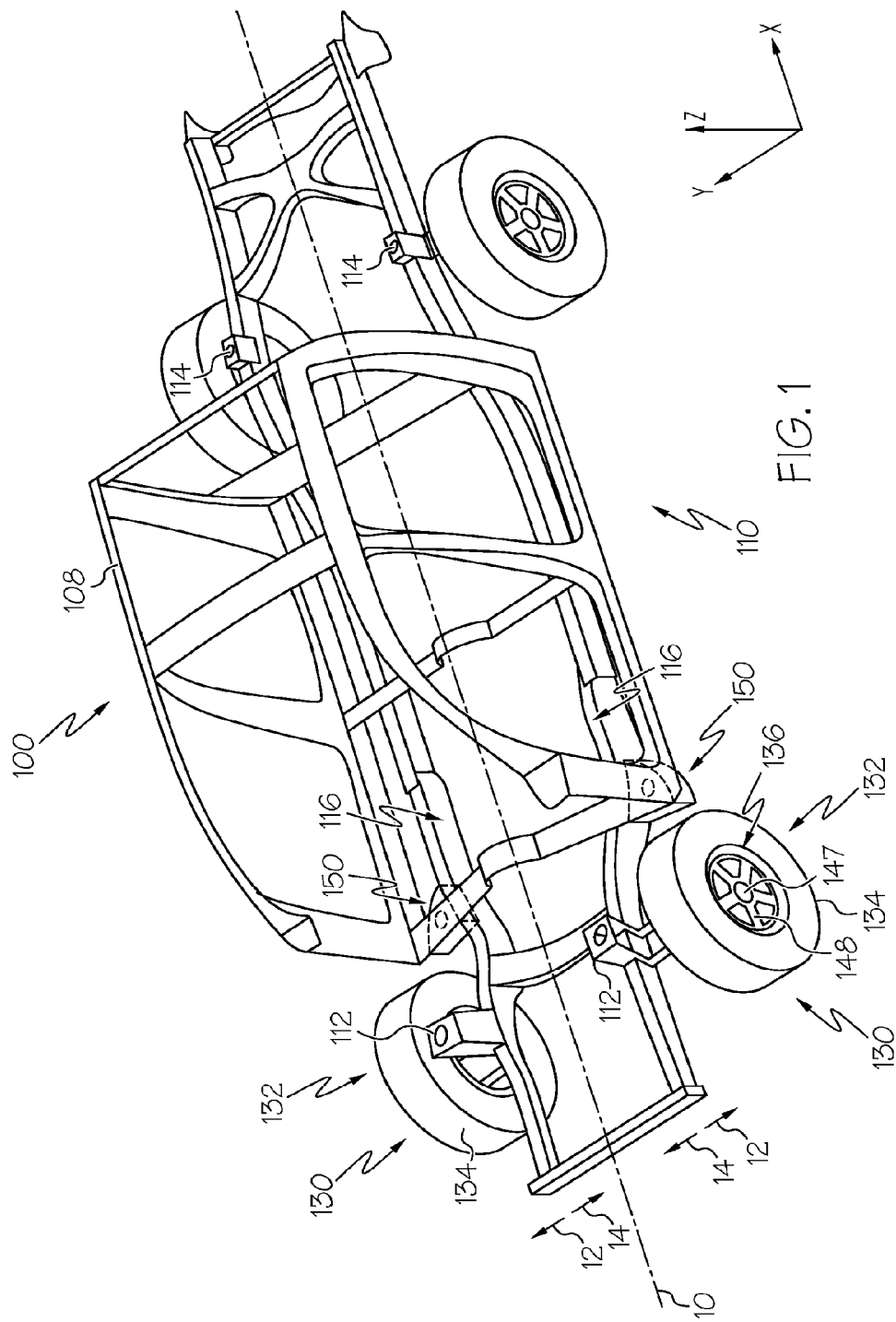
FIG. 1 schematically depicts a perspective view of a vehicle frame and a cabin according to one or more of the embodiments shown or described herein.

Referring generally to FIG. 1, vehicles may include a variety of structural configurations to support the suspension units, the drivetrain, and the passenger cabin, including "body-on-frame" construction or "unibody" construction. In a "body-on-frame" construction, a cabin frame is coupled to a vehicle frame. The suspension units and the drivetrain are coupled to and supported by the vehicle frame, while the cabin frame defines a passenger cabin of the vehicle. Vehicles with a "unibody" construction include a plurality of panels that are coupled to one another to define the structure of the vehicle. The plurality of panels may include a rocker inner panel and a rocker outer panel that are coupled together to form a rocker support. The suspension units and the drivetrain of the vehicle are coupled to these panels in vehicle having unibody construction. In vehicles using either a "body-on-frame" construction or a "unibody" construction, the vehicle structure generally includes a pair of opposing side supports spaced apart from one another. The pair of opposing side supports extend in a vehicle longitudinal direction between a pair of front suspension mounts and a pair of rear suspension mounts, as generally depicted in FIG. 1. The opposing side supports provide structural rigidity to the vehicle such that ordinary operating forces associated with suspension loads and drivetrain loads can be reacted by the vehicle structure. The vehicle also includes a pair of front suspension assemblies that are coupled to the respective front suspension mounts. The front suspension assemblies generally include, among other elements, control arms, wheel spindles, wheels, and tires.

When a vehicle strikes a barrier with a front corner of the vehicle, the structures of the vehicle plastically deform to absorb the energy of the collision. The structures of the vehicle positioned proximate to the impacting front corner of the vehicle may strike a barrier in what is referred to herein as a small front bumper overlap collision. In a small front bumper overlap collision, only a portion of the front bumper strikes the barrier. In one example, approximately 25% of the width of the bumper may contact the barrier in a small front bumper overlap collision. Because only a portion of the front bumper strikes a barrier during a small front bumper overlap collision, energy absorbing structures associated with the front bumper may have a reduced effect on the dissipation of energy of the collision. Instead, the energy from the collision may be directed into the front suspension assemblies of the vehicle. As the energy from the collision is directed into the front suspension assemblies, energy from the collision may cause the front suspension unit to be directed in a rearward direction. As the front suspension unit is directed in the rearward direction, the front suspension unit may contact components of the vehicle structure.

In describing embodiments of the vehicles and vehicle structures, the terms "inboard" and "outboard" will be used to describe the relative positioning of various components. Referring to FIG. 1, the term "outboard" as used herein refers to the relative location of a component in direction 12 with respect to a vehicle centerline 10, and the term "inboard" as used herein refers to the relative location of a component in direction 14 with respect to the vehicle centerline 10.

Referring again to FIG. 1, a vehicle 100 including energy absorption structures is schematically depicted. The vehicle 100 includes a frame 110. In embodiments according to the present disclosure that include body-on-frame construction, a cabin 108 may be coupled to the frame 110. The frame 110 includes a pair of front suspension mounts 112 and a pair of rear suspension mounts 114.

In general, the frame 110 of the vehicle 100 provides support to the suspension components and the drivetrain components of the vehicle 100. The cabin 108 of the vehicle may be attached to the frame 110 through a variety of joining techniques including, for example and without limitation, mechanical fasteners, spot welds, weld joints, structural adhesives, brazes, shear pins, and the like. Vehicles may also be constructed according to a "unibody" construction, in which the structural elements of the vehicle are coupled to one another in an integral configuration. Vehicles exhibiting unibody construction techniques generally incorporate vehicle body panels that define the cabin 108 of the unibody vehicle as components of the vehicle support structure. Vehicles exhibiting unibody construction incorporate suspension attachment points and drivetrain support structures integrally into the vehicle structure.

Figure 2:
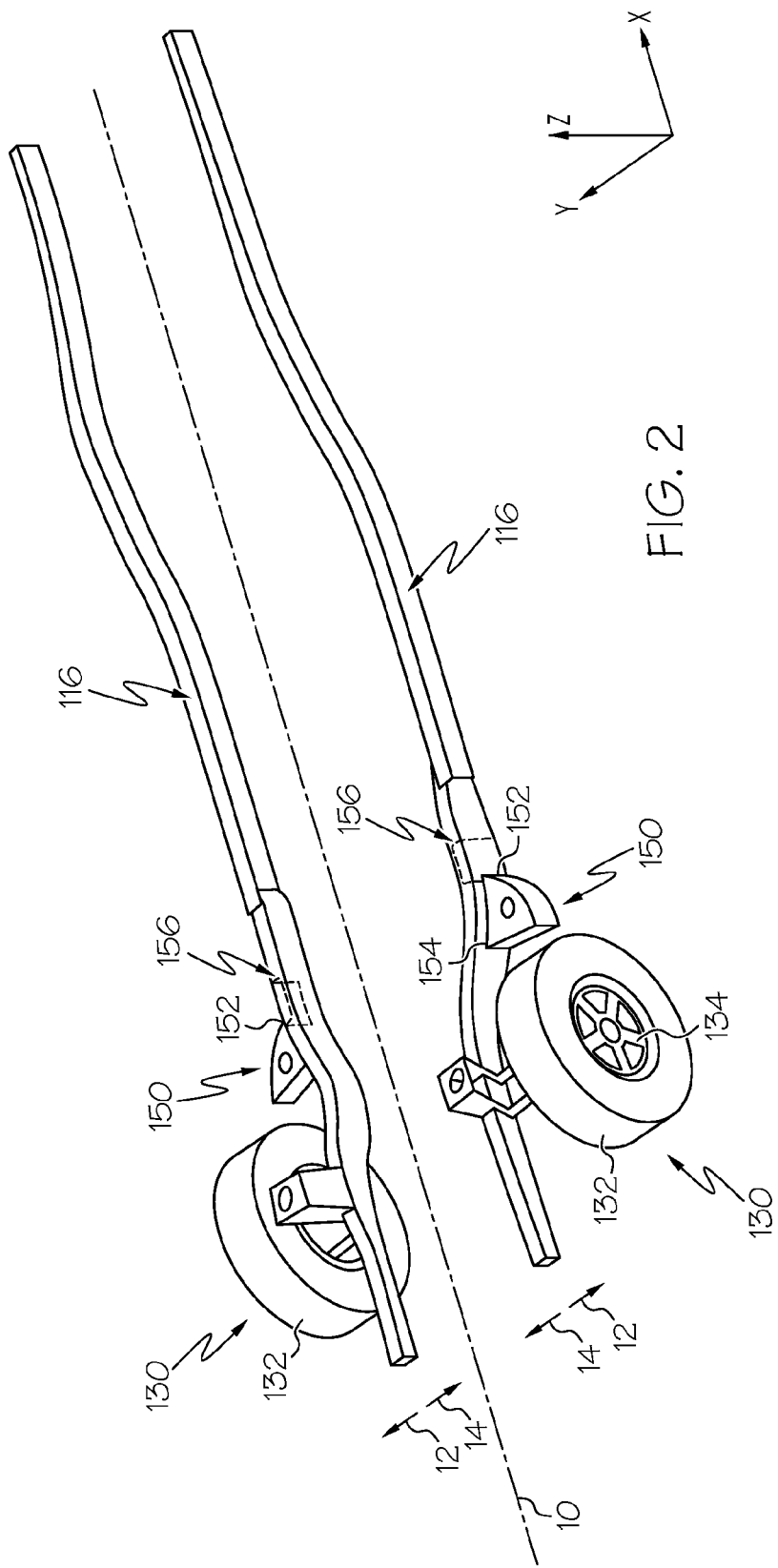
FIG. 2 schematically depicts a pair of side supports and front suspension assemblies according to one or more of the embodiments shown or described herein.

Referring to FIGS. 1 and 2, a pair of front suspension units 130 may be coupled to the front suspension mounts 112. The front suspension units 130 may generally include a wheel assembly 132. The wheel assembly 132 includes a tire 134 that is positioned to diametrically surround a wheel 136. The wheel assembly 132 is coupled to the front suspension units 130 through various additional front suspension components, as will be described in greater detail below.

Still referring to FIGS. 1 and 2, the frame 110 includes a pair of side supports 116 that are spaced apart from one another in a vehicle lateral direction, as depicted in FIGS. 1 and 2. The side supports 116 extend in a vehicle longitudinal direction (i.e., in the +/−X-direction depicted in FIGS. 1 and 2), extending between the front suspension mounts 112 and the rear suspension mounts 114. In embodiments according to the present disclosure, the front suspension mounts 112 and the rear suspension mounts 114 may be coupled to the side supports 116.

In embodiments according to the present disclosure, the vehicle 100 further includes a pair of cab mounting brackets 150 that are coupled to the pair of side supports 116. The cab mounting brackets 150 are positioned in the vehicle longitudinal direction between the front suspension mounts 112 and the rear suspension mounts 114. In embodiments, the cab mounting brackets 150 are positioned rearward of the tires 134 in the vehicle longitudinal direction (i.e., in the +X-direction depicted in FIGS. 1 and 2). The cab mounting brackets 150 extend outward from the side supports 116 in the vehicle lateral direction (i.e., in the +/−Y-direction depicted in FIGS. 1 and 2), away from the centerline 10 of the vehicle. The cab mounting brackets 150 may serve as an attachment for the frame 110 to which the cabin 108 is coupled. The cab mounting brackets 150 themselves are coupled to the side supports 116 between a rearward attachment position 152 and a forward attachment position 154.

Figure 3:
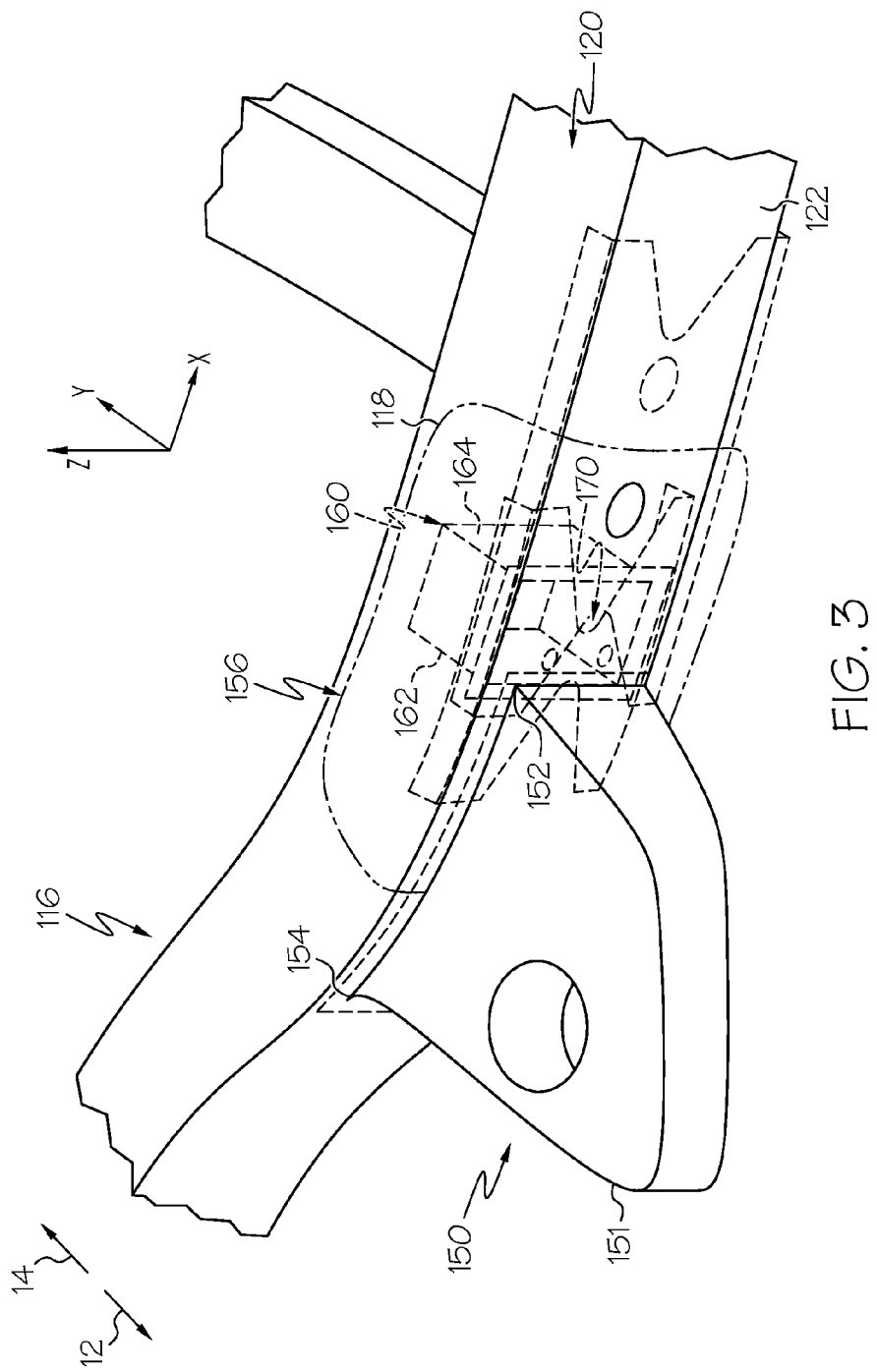
FIG. 3 schematically depicts a perspective view of a targeted energy absorption portion according to one or more of the embodiments shown or described herein.

Referring to FIGS. 1-3, certain energy absorption structures of the vehicle 100 are depicted. The side supports 116 include a targeted energy absorption portion 156 that is generally positioned proximate to the side support 116. The targeted energy absorption portion 156 is positioned between the front suspension mounts 112 and the rear suspension mounts 114 in the vehicle longitudinal direction. The targeted energy absorption portion 156 is positioned on the side support 116 at a position proximate to the cab mounting bracket 150. The targeted energy absorption portion 156 distinguishes a high-strength region 118 of the side support 116 from a nominal-strength region 120 of the side support 116. In embodiments according to the present disclosure, the high-strength region 118 of the side support 116 is positioned proximate to the targeted energy absorption portion 156. In the embodiment depicted in FIGS. 1-3, the high-strength region 118 is positioned in regions of the side support 116 that are interior of the attachment points of the cab mounting bracket 150. More specifically, the rearward attachment position 152 of the cab mounting bracket 150 is positioned proximate to the high-strength region 118 of the side support 116. The nominal-strength region 120 is positioned at locations on the side support 116 that are spaced distally from the targeted energy absorption portion 156. In the embodiment depicted in FIGS. 1-3, the nominal-strength region 120 is positioned at locations on the side support 116 that are rearward of the cab mounting brackets 150 in the vehicle longitudinal direction.

Figure 4A:
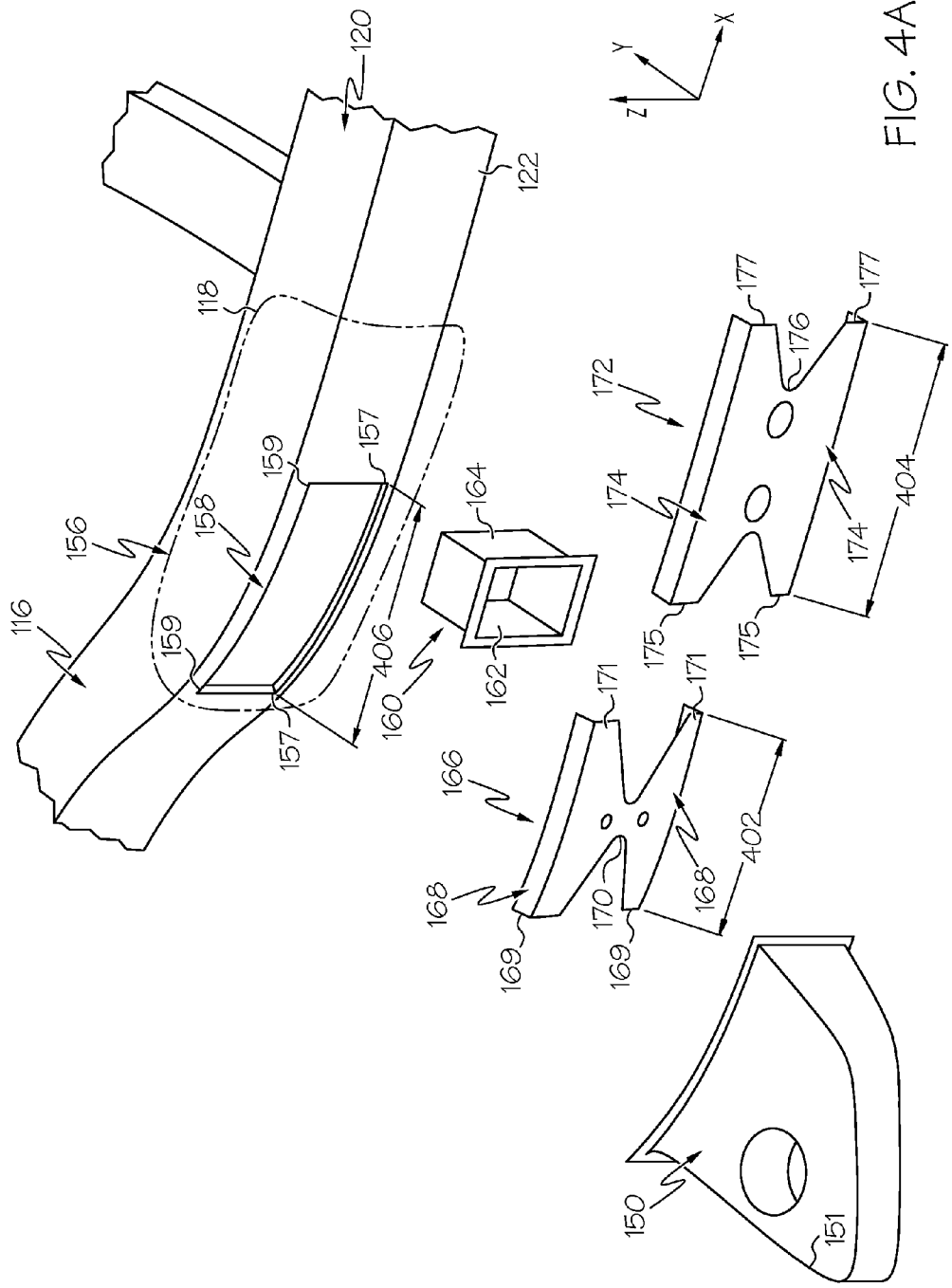
FIG. 4A schematically depicts an exploded view of a targeted energy absorption portion according to one or more of the embodiments shown or described herein.

Referring to FIGS. 3 and 4A, one embodiment of the targeted energy absorption portion 156 is depicted. FIG. 3 depicts the components of the targeted energy absorption portion 156 in an assembled state, while FIG. 4A depicts the components of the targeted energy absorption portion 156 in an exploded view so that the internal components of the targeted energy absorption portion may be easily viewed.

The targeted energy absorption portion 156 includes a reduced cross-section portion 158. The reduced cross-section portion 158 is positioned on an outward vehicle lateral direction-facing (i.e., in the −Y-direction depicted in FIG. 3) surface 122 of the side support 116. In embodiments according to the present disclosure, the reduced cross-section portion 158 may include a perforated section of the surface 122 in which a portion of the outward vehicle lateral direction surface 122 is removed. The reduced cross-section portion 158 may include a pair of lower corners 157 and a pair of upper corners 159. The reduced cross-section portion has a length 406 that is evaluated between the pair of lower corners 157 in the vehicle longitudinal direction. In embodiments, the reduced cross-section portion 158 may have a generally rectangular shape such that the length 406 may be similarly evaluated between the pair of upper corners 159 in the vehicle longitudinal direction.

In embodiments according to the present disclosure, the targeted energy absorption portion 156 may include an interior reinforcement member 160. As depicted in FIG. 4A, the interior reinforcement member 160 includes a forward wall portion 162 and a rearward wall portion 164. Referring now to FIG. 3, when assembled into the side support 116, the interior reinforcement member 160 may be positioned at least partially inside the side support 116 at a position proximate to the reduced cross-section portion 158. In the depicted embodiment, the forward wall portion 162 is positioned in a forward direction from the rearward wall portion 164 when evaluated in a vehicle longitudinal direction (i.e., in the −X-direction depicted in FIG. 3). When assembled into the side support 116 and/or coupled to the side support 116, the forward wall portion 162 and the rearward wall portion 164 generally extend in a vehicle lateral direction (i.e., in the +/−Y-direction depicted in FIG. 3).

In embodiments according to the present disclosure, the forward wall portion 162 may be positioned proximate to the rearward attachment position 152 of the cab mounting bracket 150. As used herein, the term "positioned proximate" in reference to the position of the forward wall portion 162 with respect to the rearward attachment position 152 means that the forward wall portion 162 is positioned within about 30 mm of the rearward attachment position 152 in the vehicle longitudinal direction. In some embodiments, the forward wall portion 162 is positioned within about 15 mm of the rearward attachment position 152 in the vehicle longitudinal direction. In yet other embodiments, the rearward attachment position 152 of the cab mounting bracket 150 may overlap the forward wall portion 162. The proximate positioning between the rearward attachment position 152 of the cab mounting bracket 150 and the forward wall portion 162 creates an effective load path across the interface between the cab mounting bracket 150 and the interior reinforcement member 160 such that the load introduced by the cab mounting bracket 140 into the targeted energy absorption portion 156 can be translated, in substantial portion, into the forward wall portion 162 of the interior reinforcement member 160.

Referring to FIG. 4B, another embodiment of the interior reinforcement member 160 is depicted. Similar to the embodiment described with respect to FIG. 4A, the interior reinforcement member 160 includes a forward wall portion 162. However, in this embodiment, the interior reinforcement member 160 includes an interior wall portion 163 that is generally perpendicular to the forward wall portion 162. When assembled into the side support 116, the interior reinforcement member 160 may be positioned at least partially inside the side support 116 at a position proximate to the reduced cross-section portion 158. When assembled into the side support 116 and/or coupled to the side support 116, the forward wall portion 162 generally extends in a vehicle lateral direction (i.e., in the +/−Y-direction depicted in FIG. 4B). In embodiments according to the present disclosure, the forward wall portion 162 may be positioned proximate to the rearward attachment position 152 of the cab mounting bracket 150. As described hereinabove, the forward wall portion 162 may be positioned within about 30 mm of the rearward attachment position 152 in the vehicle longitudinal direction. In some embodiments, the forward wall portion 162 is positioned within about 15 mm of the rearward attachment position 152 in the vehicle longitudinal direction. In yet other embodiments, the rearward attachment position 152 of the cab mounting bracket 150 may overlap the forward wall portion 162. The proximate positioning between the rearward attachment position 152 of the cab mounting bracket 150 and the forward wall portion 162 creates an effective load path across the interface between the cab mounting bracket 150 and the interior reinforcement member 160 such that the load introduced by the cab mounting bracket 140 into the targeted energy absorption portion 156 can be translated, in substantial portion, into the forward wall portion 162 of the interior reinforcement member 160.

Figure 4C:
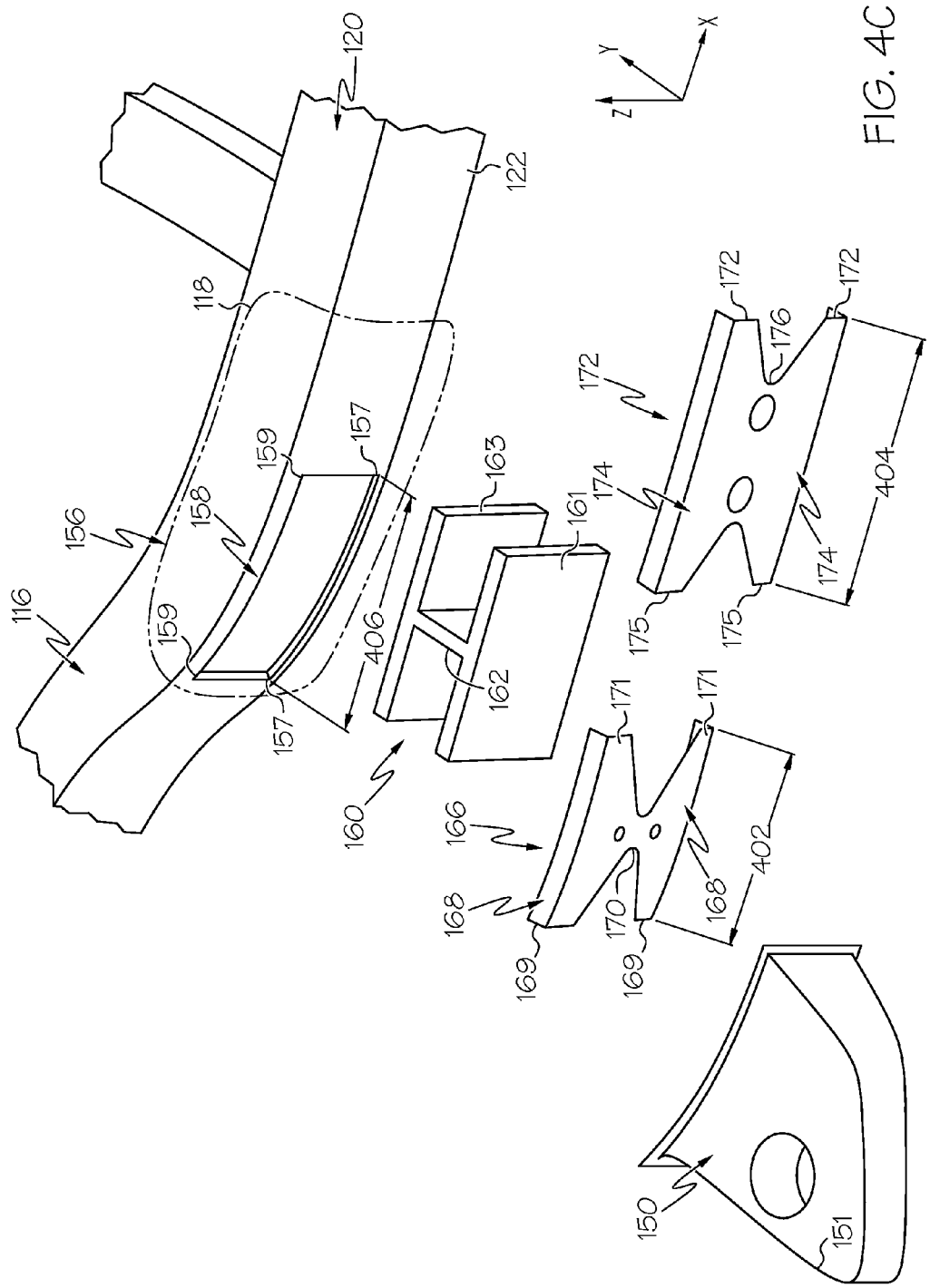
FIG. 4C schematically depicts an exploded view of a targeted energy absorption portion according to one or more of the embodiments shown or described herein.

Referring now to FIG. 4C, another embodiment of the interior reinforcement member is depicted. Similar to the embodiments described with respect to FIGS. 4A and 4B, the interior reinforcement member 160 includes a forward wall portion 162. However, in this embodiment, the interior reinforcement member 160 includes an interior wall portion 163 and an exterior wall portion 161 that are generally perpendicular to the forward wall portion 162. When assembled into the side support 116, the interior reinforcement member 160 may be positioned at least partially inside the side support 116 at a position proximate to the reduced cross-section portion 158. When assembled into the side support 116 and/or coupled to the side support 116, the forward wall portion 162 generally extends in a vehicle lateral direction (i.e., in the +/−Y-direction depicted in FIG. 4C). In embodiments according to the present disclosure, the forward wall portion 162 may be positioned proximate to the rearward attachment position 152 of the cab mounting bracket 150. As described hereinabove, the forward wall portion 162 may be positioned within about 30 mm of the rearward attachment position 152 in the vehicle longitudinal direction. In some embodiments, the forward wall portion 162 is positioned within about 15 mm of the rearward attachment position 152 in the vehicle longitudinal direction. In yet other embodiments, the rearward attachment position 152 of the cab mounting bracket 150 may overlap the forward wall portion 162. The proximate positioning between the rearward attachment position 152 of the cab mounting bracket 150 and the forward wall portion 162 creates an effective load path across the interface between the cab mounting bracket 150 and the interior reinforcement member 160 such that the load introduced by the cab mounting bracket 140 into the targeted energy absorption portion 156 can be translated, in substantial portion, into the forward wall portion 162 of the interior reinforcement member 160.

Referring now to FIGS. 3, 4A, 4B, and 4C collectively, the targeted energy absorption portion 156 may also include a first exterior reinforcement member 166 and/or a second exterior reinforcement member 172. As depicted in FIGS. 3, 4A, 4B, and 4C, the first exterior reinforcement member 166 may have a pair of extended wings 168 and a narrow waist portion 170 that is positioned between the extended wings 168, such that the first exterior reinforcement member 166 exhibits a butterfly-like shape. The extended wings 168 of the first exterior reinforcement member 166 may be spaced apart from one another such that the extended wings 168 span between a lower corner 157 and an upper corner 159 of the reduced cross-section portion 158 in a vehicle vertical direction (i.e., in the +/−Z-direction depicted in FIGS. 3 and 4A-4C).

The extended wings 168 may extend between a forward end 169 and a rearward end 171 of the first exterior reinforcement member 166. The extended wings 168 have a length 402 that is evaluated between the forward end 169 and the rearward end 171. In embodiments that include only a first exterior reinforcement member 166, the length 402 may be greater than the length 406 of the reduced cross-section portion 158. Accordingly, in embodiments including only a first exterior reinforcement member 166, the extended wings 168 may extend between ones of the lower corners 157 and ones of the upper corners 159 of the reduced cross-section portion 158 in the vehicle longitudinal direction (i.e., in the +/−X-direction depicted in FIGS. 3 and 4A-4C). In embodiments including a first exterior reinforcement member 166 and a second exterior reinforcement member 172, the length 402 of the first exterior reinforcement member 166 may be less than the length 406 of the reduced cross-section portion 158.

Referring to FIGS. 3 and 4A-4C, the first exterior reinforcement member 166 may be coupled to the side support 116 proximate to the reduced cross-section portion 158 in the vehicle longitudinal direction. In embodiments, the forward end 169 of the extended wings 168 may be coupled to the upper corner 159 and the lower corner 157 of the reduced cross-section portion 158 of the side support 116. The narrow waist portion 170 of the first exterior reinforcement member 166 may be detached from the side support 116. The exterior reinforcement member 166 may at least partially cover the reduced cross-section portion 158. In some embodiments, the first exterior reinforcement member 166 may be positioned outboard of the interior reinforcement member 160 in the vehicle lateral direction. The first exterior reinforcement member 166 may be coupled to the side support 116 through a variety of joining techniques including, for example and without limitation, mechanical fasteners, spot welds, weld joints, structural adhesives, brazes, shear pins, and the like.

Still referring to FIGS. 3, 4A, 4B, and 4C collectively, the targeted energy absorption portion 156 may further include a second exterior reinforcement member 172. Similar to the first exterior reinforcement member 166, the second exterior reinforcement member 172 may have a pair of extended wings 174 and a narrow waist portion 176 that is positioned between the pair of extended wings 174, such that the second exterior reinforcement member 172 exhibits a butterfly-like shape. The extended wings 174 of the second exterior reinforcement member 172 may be spaced apart from one another such that the extended wings 174 span between a lower corner 157 and an upper corner 159 of the reduced cross-section portion 158 in the vehicle vertical direction (i.e., in the +/−Z-direction depicted in FIGS. 3 and 4A-4C).

The extended wings 174 may extend between a forward end 175 and a rearward end 177 of the second exterior reinforcement member 172. The extended wings 174 have a length 404 that is evaluated between the forward end 175 and the rearward end 177.

Referring to FIGS. 3 and 4A-4C, the second exterior reinforcement member 172 may be coupled to the side support 116 proximate to the reduced cross-section portion 158 in the vehicle longitudinal direction. In embodiments, the forward end 175 of the extended wings 174 may be coupled to the upper corner 159 and the lower corner 157 of the reduced cross-section portion 158 of the side support 116. The narrow waist portion 176 of the second exterior reinforcement member 172 may be detached from the side support 116. The second exterior reinforcement member 172 may at least partially cover the reduced cross-section portion 158. In embodiments according to the present disclosure, the second exterior reinforcement member 172 may be positioned outboard from the interior reinforcement member 160 in the vehicle lateral direction. The second exterior reinforcement member 127 may be coupled to the side support 116 through a variety of joining techniques including, for example and without limitation, mechanical fasteners, spot welds, weld joints, structural adhesives, brazes, shear pins, and the like.

In embodiments that include both a first and second exterior reinforcement member 166, 172, the first and second exterior reinforcement members 166, 172 may be coupled to the side support 116 proximate to the reduced cross-section portion 158. In embodiments including both a first and second exterior reinforcement member 166, 172, the combined lengths 402 and 404 of the first and second exterior reinforcement members 166, 172 may be greater than the length 406 of the reduced cross-section portion 158. Accordingly, the first exterior reinforcement member 166 and the second exterior reinforcement member 172 may extend between ones of the lower corners 157 and upper corners 159 of the reduced cross section 158 in the vehicle longitudinal direction. Further, the first exterior reinforcement member 166 and the second exterior reinforcement member 172 may at least partially overlap one another in the vehicle longitudinal direction, as depicted in FIG. 3.

Figure 5:
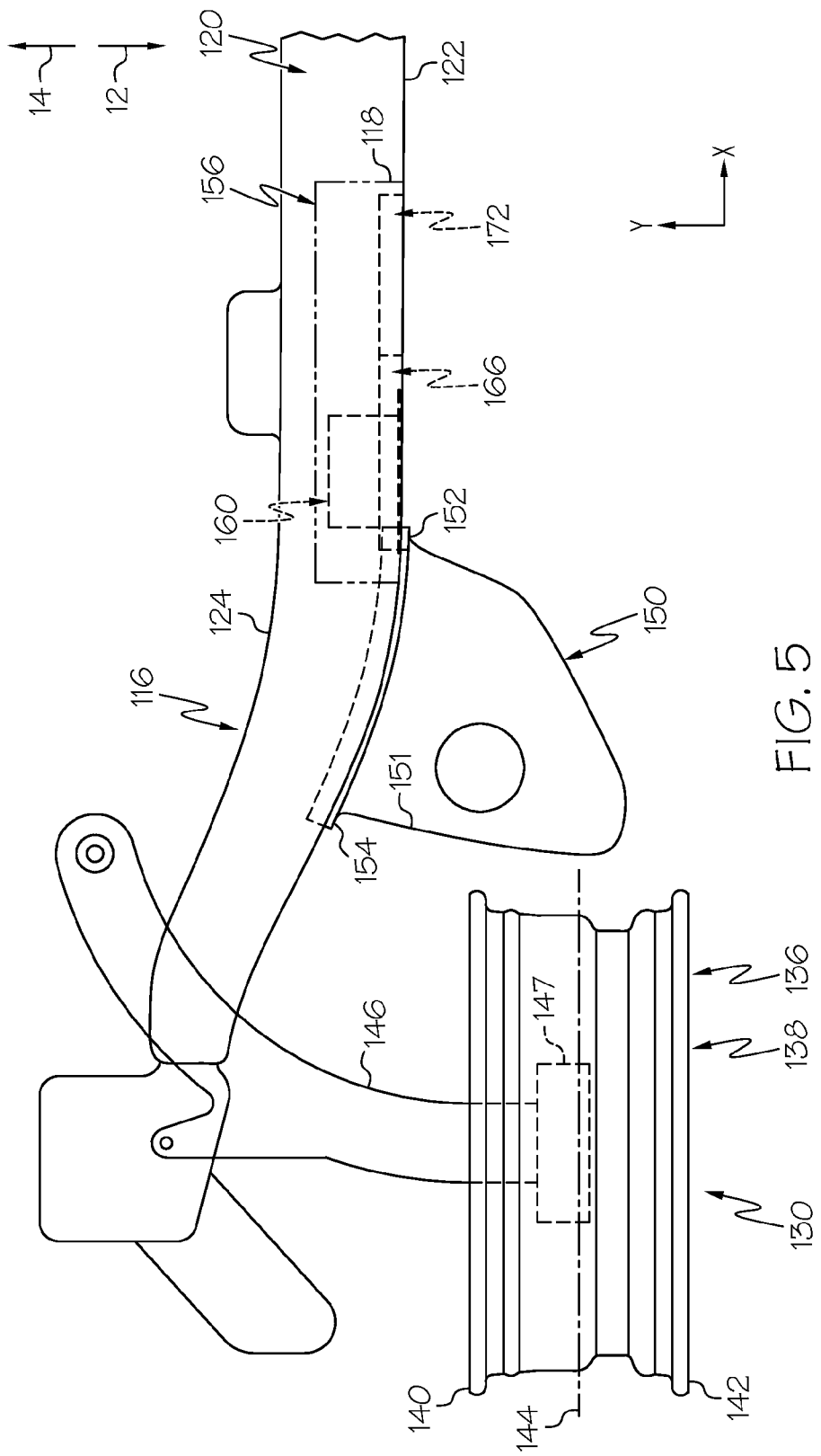
FIG. 5 schematically depicts a top view of a targeted energy absorption portion according to one or more of the embodiments shown or described herein.

Referring now to FIGS. 1 and 5, elements of the front suspension unit 130 are shown in greater detail. As noted above, the front suspension unit 130 includes a wheel 136. The wheel 136 includes a rim 138 having an inner flange 140 and an outer flange 142 opposing and spaced apart from the inner flange 140. A rim centerline 144 is positioned between the outer flange 142 and the inner flange 140, and bisects the rim 138. The wheel 136 may also include a hub mount 147 that is positioned at a diametrically interior position of the inner flange 140 and the outer flange 142. The wheel 136 may also include a rim center portion 148 that extends in a generally circumferential orientation from the hub mount 147 to the rim 138. The hub mount 147 may be coupled to a hub of the front suspension unit 130, thereby coupling the wheel 136 to the front suspension unit 130.

The front suspension unit 130 may further include a knuckle 146 that couples the wheel 136 to various suspension linkages of the front suspension unit 130. The knuckle 146 may couple the wheel 136 to the steering components (not depicted) of the front suspension unit 130. In general, the front suspension unit 130 maintains the relative position of the wheel 136 relative to the vehicle 100 in the vehicle longitudinal direction and the vehicle lateral direction as the vehicle 100 is operated along road surfaces.

In embodiments according to the present disclosure, the cab mounting bracket 150 includes a forward end portion 151 that faces towards and is positioned proximate to the rim 138 of the wheel 136. The cab mounting bracket 150 may extend in the vehicle lateral direction outward from the side support 116, such that at least a portion of the cab mounting bracket 150 extends beyond the centerline 144 of the rim 138. As depicted in FIG. 5, at least a portion of the cab mounting bracket 150 may positioned proximate to the hub mount 147 of the wheel 136 when evaluated in the vehicle lateral direction (i.e., in the −Y-direction depicted in FIG. 5).

Figure 6:
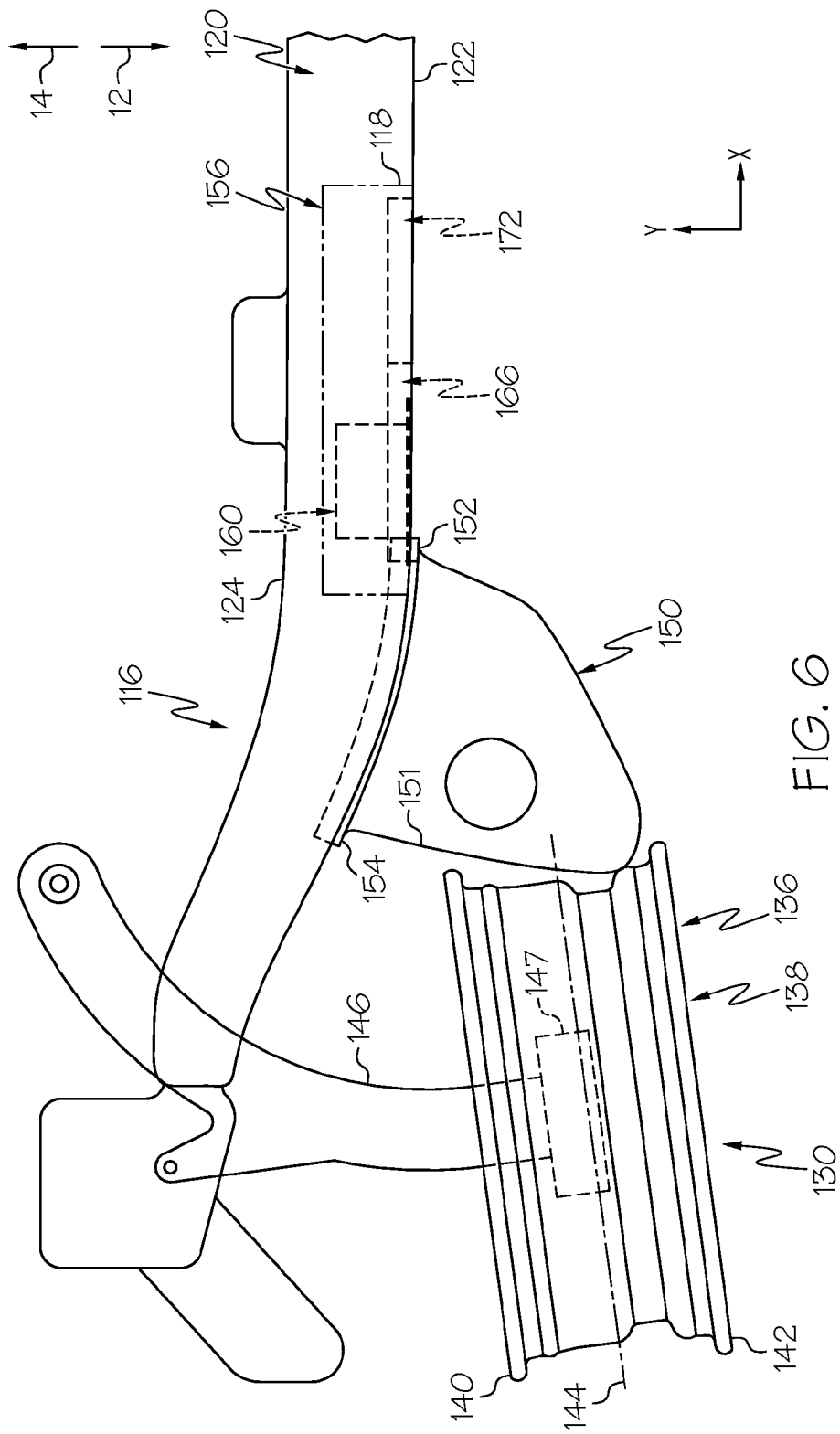
FIG. 6 schematically depicts a top view of a targeted energy absorption portion at the initiation of a collision according to one or more of the embodiments shown or described herein.

Referring now to FIG. 6, one embodiment of the targeted energy absorption portion 156 is depicted at the initiation of a collision, such as a small front bumper overlap collision. As described above, during a small front bumper overlap collision, energy absorbing structures associated with the front bumper may have a reduced effect on the dissipation of energy of the collision. Instead, the energy from the collision may be directed into the front suspension units 130. As energy from the collision is directed into the front suspension unit 130, the energy from the collision may cause the front suspension unit 130 to translate in a generally rearward direction (i.e., in the +X-direction depicted in FIG. 6). In particular, the front suspension unit 130 may rotate with respect to the side support 116 such that the wheel 136 of the front suspension unit 130 translates in a generally rearward direction.

Figure 7:
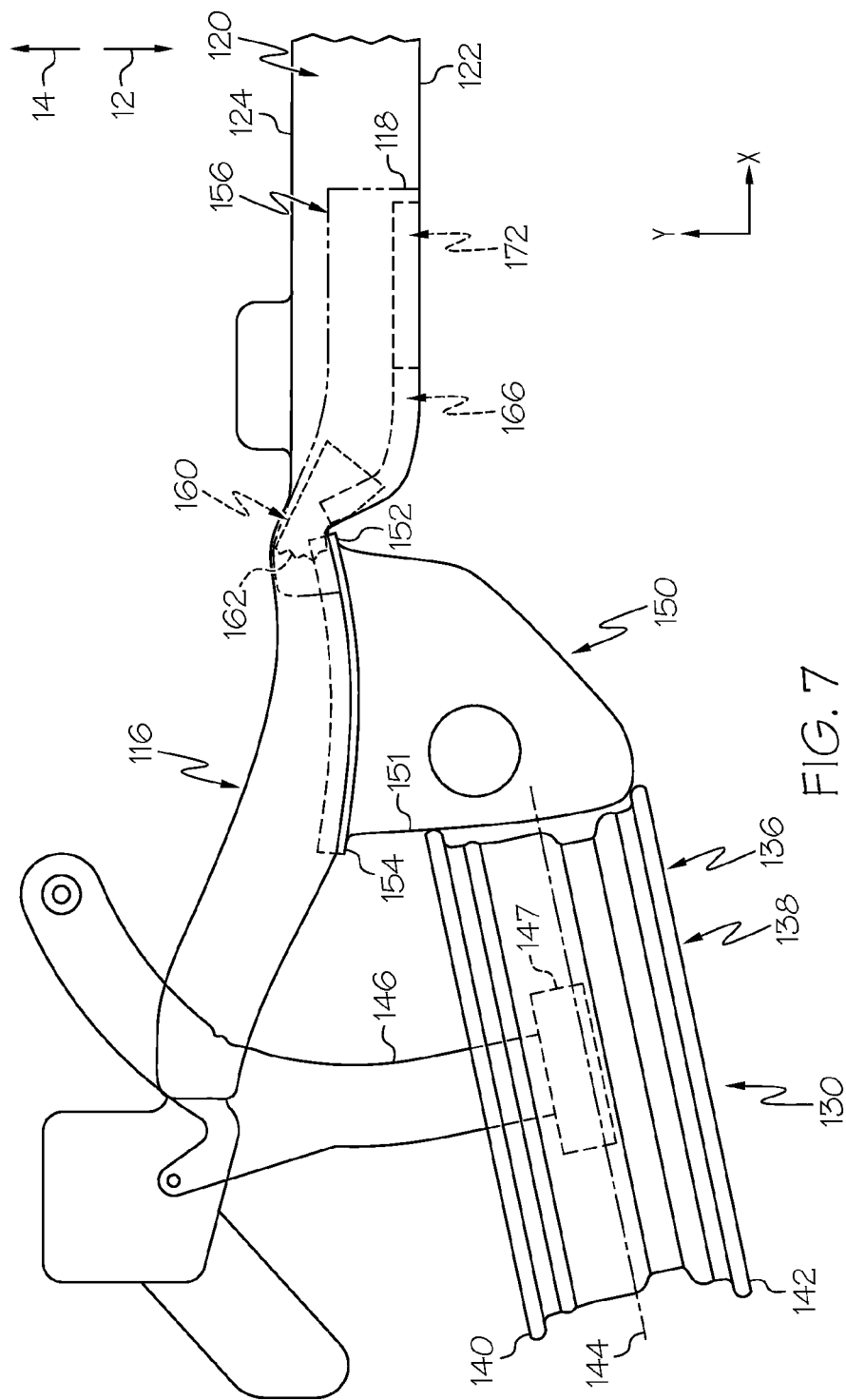
FIG. 7 schematically depicts a top view of a targeted energy absorption portion under deformation according to one or more of the embodiments shown or described herein.

During a small front bumper overlap collision in which portions of the energy dissipation features of the vehicle 100 are not activated, energy associated with the collision may be introduced into the surrounding vehicle structures. Referring to FIGS. 6 and 7, the barrier that makes contact with the vehicle 100 may translate rearward relative towards the vehicle 100. The barrier may direct energy from the collision into the components of the front suspension unit 130. As depicted in FIGS. 5 and 6, the barrier may direct energy into the wheel 136 of the front suspension unit 130. The wheel 136 of the front suspension unit 130 may translate rearward as a result of the energy introduced by the barrier to the vehicle 100. The wheel 136 may impact the forward end portion 151 of the cab mounting bracket 150. As the wheel 136 impacts the forward end portion 151 of the cab mounting bracket 150, the wheel 136 introduces a force to the cab mounting bracket 150 in a rearward direction. Because the cab mounting bracket 150 is coupled to the side support 116 at an inward position from the application of force from the wheel 136, the force applied by the wheel 136 may tend to rotate the cab mounting bracket 150 about its attachment point. The cab mounting bracket 150 may rotate with respect to the side support 116, whereby the rearward attachment position 152 of the cab mounting bracket 150 translates inward (i.e., in the +Y-direction depicted in FIGS. 6 and 7). As the rearward attachment position 152 translates inward, the rearward attachment position 152 directs energy of the collision into the targeted energy absorption portion 156 at a position proximate to the forward wall portion 162 of the interior reinforcement member 160. The forward wall portion 162 of the interior reinforcement member 160, therefore, may increase a buckling resistance of the side support 116 in the vehicle lateral direction (i.e., in the +/−Y direction depicted in FIGS. 6 and 7) by increasing the load handling capability of the side support 116 from energy associated with a small front bumper overlap collision.

As the rearward attachment position 152 translates inward, the interior reinforcement member 160 may tend to rotate. As the interior reinforcement member 160 rotates, the rearward wall portion 164 may engage the side support 116. Because the rearward wall portion 164 engages the side support 116, the rearward wall may maintain the position of the forward wall portion 162 proximate to the rearward attachment position 152 of the cab mounting bracket 150. Similarly, in embodiments including an interior wall portion 163 and/or an exterior wall portion 161, the interior wall portion 163 and/or the exterior wall portion 161 may engage the side support 116 such that position of the forward wall portion 162 remains proximate to the rearward attachment position 152 of the cab mounting bracket 150. By maintaining the forward wall portion 162 proximate to the rearward attachment position 152 of the cab mounting bracket 150. energy may be directed into the forward wall portion 162 from the rearward attachment position 152 as the rearward attachment position 152 translates inward.

Because the forward wall portion 162 of the interior reinforcement member 160 increases the buckling resistance of the side support, the interior reinforcement member 160 increases the amount of energy that may be absorbed and/or directed by the side support 116 caused by the cab mounting bracket 150 rotating into the side support 116. Further, because the cab mounting bracket 150 may be used to couple the cabin 108 to the frame 110 in vehicles using a body-on-frame construction technique, an increase in the amount of energy that may be absorbed by the side support 116 may assist in preventing the cabin 108 from separating from the cab mounting bracket 150, and, therefore, the frame 110 of the vehicle 100.

Further, by incorporating a cab mounting bracket 150 into the frame 110 in which the cab mounting bracket 150 extends to a position outboard of the centerline 144 of the rim 138 of the front suspension unit 130. The outboard position to which the cab mounting bracket 150 extends may increase the likelihood of contact between the wheel 136 and the forward end portion 151 of the cab mounting bracket 150. Further, the wheel 136 may exhibit its greatest resistance to crushing at a location proximate to the hub mount 147. By including a cab mounting bracket 150 that extends to an outboard position proximate to the hub mount 147, energy from a small front bumper overlap collision can be transferred in a position that generally corresponds to the hub mount 147 and into the forward end portion 151 of the cab mounting bracket 150. By transferring the energy associated with the collision at a position that generally corresponds to the position of the hub mount 147, the energy of the collision may be conveyed through the wheel 136 and into the designated support structure of the vehicle 100. Further, by incorporating a cab mounting bracket 150 that extends to an outboard position proximate to the hub mount 147, including extending to a position outboard of the rim centerline 144, a significant portion of the wheel 136 will likely contact the forward end portion 151 of the cab mounting bracket 150 in a small front bumper overlap collision in which the wheel 136 is driven rearward by the collision. By increasing the positional overlap between the wheel 136 and the cab mounting bracket 150, the likelihood of energy associated with the collision being transferred back to the cab mounting bracket 150 increases.

In embodiments according to the present disclosure that include a first exterior reinforcement member 166 and/or a second exterior reinforcement member 172, the first exterior reinforcement member 166 and the second exterior reinforcement member 172 may resist twisting of the side support 116 at positions proximate to the targeted energy absorption portion 156. During a small front bumper overlap collision, in addition to energy imparted to the side support 116 as a result of the front suspension unit 130 impacting the cab mounting bracket 150, energy associated with the collision may be directed into the side support. The energy may causing the side support to twist (i.e., to rotate about the X-direction and/or the Y-direction depicted in FIGS. 6 and 7).

Because the first exterior reinforcement member 166 and/or the second exterior reinforcement member 172 extend across the lower corners 157 and the upper corners 159 of the reduced cross-section portion 158, the first exterior reinforcement member 166 and the second exterior reinforcement member 172 selectively increase the resistance of the side support 116 to twisting. Reducing the likelihood of the side support 116 to twist may enhance the ability to transfer energy associated with the collision along the deformed side support 116 by maintaining as much of the planar structural integrity as possible.

However, as discussed hereinabove, the narrow waist portion 170 of the first exterior reinforcement member 166 and/or the narrow waist portion 176 of the second exterior reinforcement member 172 are detached from the side support 116. Because the narrow waist portion 170 and the narrow waist portion 176 are detached from the side support 116, the first exterior reinforcement member 166 and/or the second exterior reinforcement member 172 may allow some twist of the side support 116. By providing some compliance, allowing the side support 116 to twist, the first exterior reinforcement member 166 and the second reinforcement member 172 may accommodate forces that may be applied to the side support during normal vehicle operation.

Further, the first exterior reinforcement member 166 and/or the second exterior reinforcement member 172 may distribute energy imparted to the reduced cross-section portion 158 as the cab mounting bracket 150 rotates into the side support 116. As described hereinabove, the extended wings 168, 174 of the first and second exterior reinforcement members 166, 172 extend between the lower corners 157 and the upper corners 159 of the reduced cross-section portion 158 in the vehicle vertical direction (i.e., in the +/−Z-direction depicted in FIGS. 3 and 4A-4C). Further, as described hereinabove, the extended wings 168, 174 of the first and second exterior reinforcement member 166, 172 may extend between the lower corners 157 and the upper corners 159 of the reduced cross-section portion 158 in the vehicle longitudinal direction (i.e., in the +/−X-direction depicted in FIGS. 3 and 4A-4C). Because the first and second exterior reinforcement members 166, 172 extend between the lower corners 157 and the upper corners 159 of the reduced cross-section portion 158, the first and second exterior reinforcement members 166, 172 may distribute energy imparted to the reduced cross-section 158 to portions of the side support 116 outside of the reduced cross-section portion 158.

Additionally, as described hereinabove, in embodiments that include both a first and second exterior reinforcement member 166, 172, the first exterior reinforcement member 166 and the second exterior reinforcement member 172 may at least partially overlap one another in the vehicle longitudinal direction. The first and second exterior reinforcement member 166, 172 may exhibit an increased strength and/or stiffness at a position proximate to the overlap between the first and second exterior reinforcement member 166, 172 as compared to nominal portions of the first and second exterior reinforcement members 166, 172. Accordingly, the first and second exterior reinforcement members 166, 172 may increase the buckling resistance of the side support 116 at a location proximate to the overlap between the first and second exterior reinforcement members 166, 172. By increasing the buckling resistance of the side support 116, the first and second exterior reinforcement members 166, 172 may increase the amount of energy that may be absorbed by the side support 116 as the cab mounting bracket 150 rotates into the side support 116.

Figure 8:
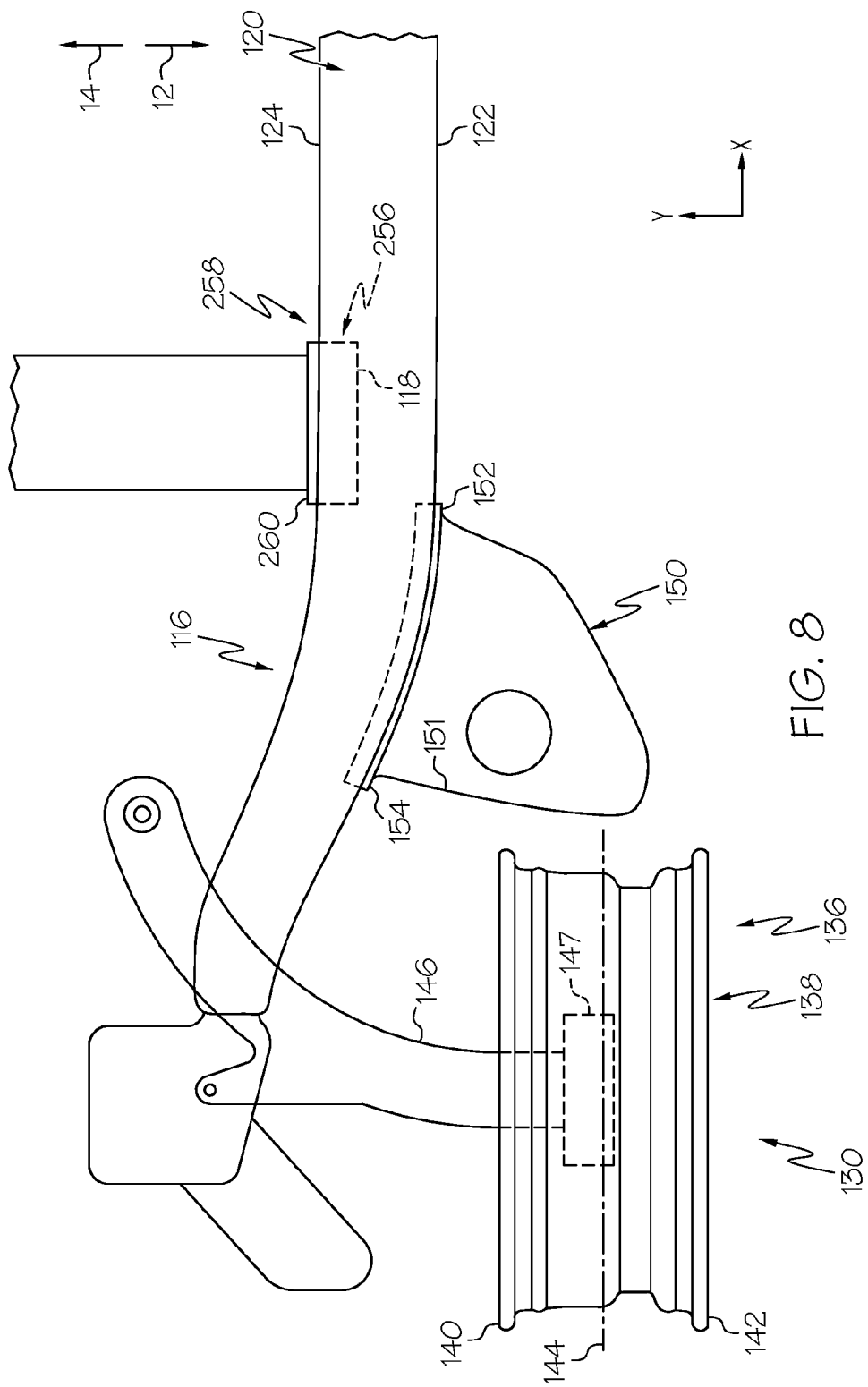
FIG. 8 schematically depicts a top view of a targeted energy absorption portion according to one or more of the embodiments shown or described herein.

Referring now to FIG. 8, another embodiment of the targeted energy absorption portion is depicted. The side support 116 includes a targeted energy absorption portion 256 that is positioned on the side support 116 between the front suspension mounts 112 and the rear suspension mounts 114. In this embodiment, the targeted energy absorption portion 256 includes an increased cross-section portion 258. The targeted energy absorption portion 256 is positioned on the side support 116 at a position proximate to the cab mounting bracket 150. The targeted energy absorption portion 256 distinguishes a high-strength region 118 of the side support 116 from a nominal-strength region 120 of the side support 116. In embodiments according to the present disclosure, the high-strength region 118 of the side support 116 is positioned proximate to the targeted energy absorption portion 256. The nominal-strength region 120 is positioned at locations on the side support 116 that are positioned distally from the targeted energy absorption portion 256.

In embodiments according to the present disclosure, the targeted energy absorption portion 256 includes the increased cross-section portion 258. The increased cross-section portion 258 is positioned on a surface 124 of the side support 116 that is positioned in an inward vehicle lateral direction-facing (i.e., in the −Y-direction depicted in FIG. 8) surface 124. In embodiments according to the present disclosure, the rearward attachment position 152 of the cab mounting bracket 150 is positioned proximate to the increased cross-section portion 258. The increased cross-section portion 258 may include an increased thickness of the inward vehicle lateral direction-facing surface 124 that is positioned proximate to the increased cross-section portion 258. In another embodiment, the increased cross-section portion 258 may include a reinforcement member 260 that is positioned on the inward vehicle lateral direction-facing surface 124 of the side support 116.

The increased cross-section portion 258 may be positioned proximate to the reinforcement member 260 such that force introduced to the side support 116 is directed into reinforcement member 260 by the increased cross-section portion 258. The increased cross-section portion 258, therefore, may increase the energy absorbing capacity of the side support 116. The increased cross-section portion 258 may be positioned along the side support 116 at a position opposite the rearward attachment portion 152 of the cab mounting bracket 150. In one embodiment, the increased cross-section portion 258 may be positioned within about 30 mm of the rearward attachment portion 152 of the cab mounting bracket 150 as evaluated in the vehicle longitudinal direction.

As noted above, the front suspension unit 130 includes a wheel 136. As discussed above in regard to FIG. 5, the wheel 136 includes the rim 138 having the inner flange 140 and the outer flange 142 that opposes the inner flange 140. The rim centerline 144 is positioned between the outer flange 142 and the inner flange 140, and bisects the rim 138. The front suspension unit 130 may further include a knuckle 146 that couples the wheel 136 to various steering components (not depicted) and the frame 110.

Referring again to FIG. 8, the cab mounting bracket 150 includes a forward end portion 151 that faces towards and is positioned proximate to the rim 138 of the wheel 136. The cab mounting bracket 150 may extend in the vehicle lateral direction outward from the side support 116, such that at least a portion of the cab mounting bracket 150 extends beyond the centerline 144 of the rim 138 in the vehicle lateral direction (i.e., in the −Y-direction depicted in FIG. 8).

Figure 9:
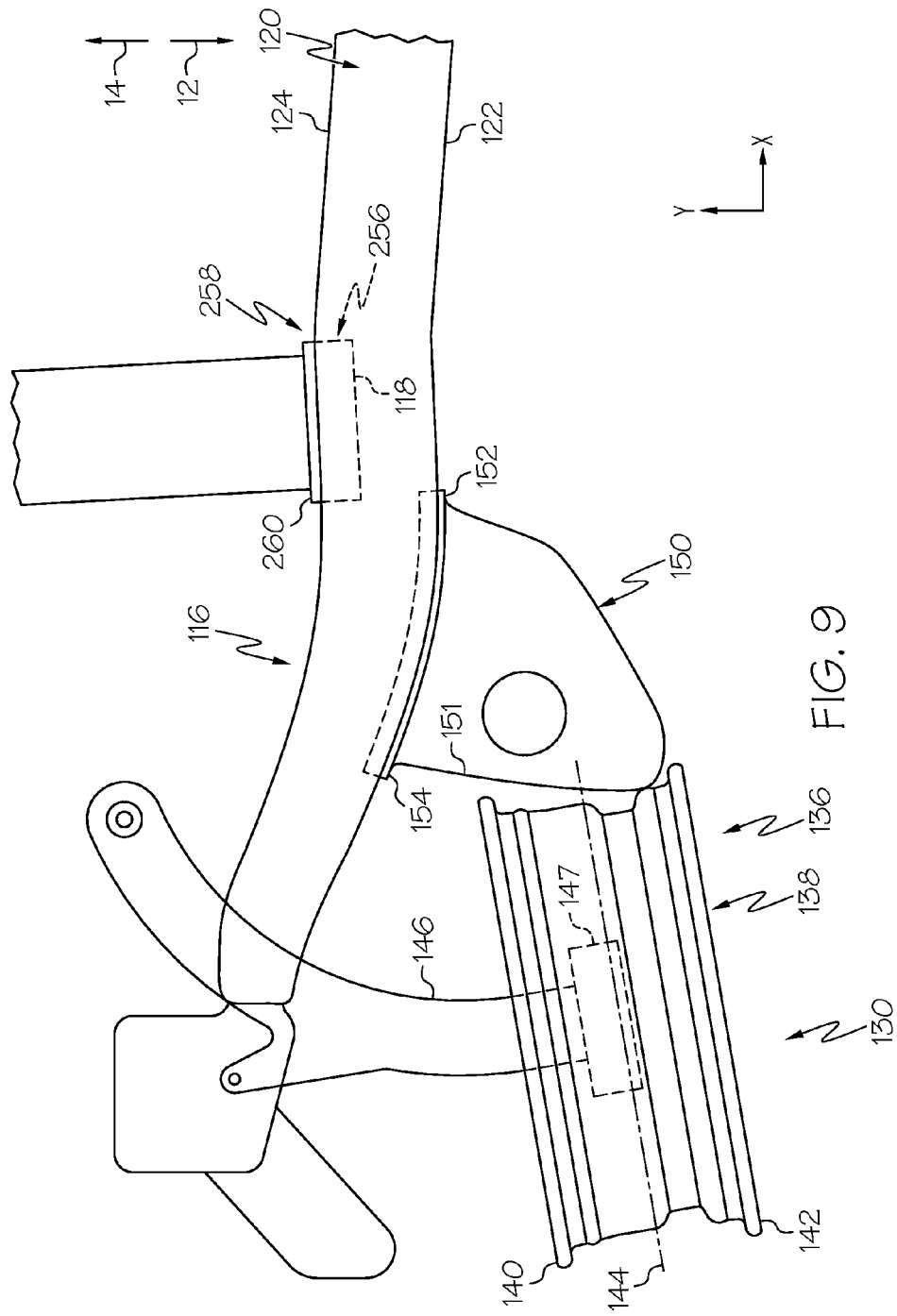
FIG. 9 schematically depicts a top view of a targeted energy absorption portion at the initiation of a collision according to one or more of the embodiments shown or described herein.

Referring now to FIG. 9, one embodiment of the targeted energy absorption portion 256 is depicted at the initiation of a collision, for example, at the initiation of a small front bumper overlap collision. As described above, during a small front bumper overlap collision, energy absorbing structures associated with the front bumper may have a reduced effect on the dissipation of energy of the collision. Instead, the energy from the collision may be directed into the front suspension units 130. As energy from the collision is directed into the front suspension unit 130, the energy from the collision may cause the front suspension unit 130 to translate in a generally rearward direction (i.e., in the +X-direction depicted in FIG. 9). In particular, the front suspension unit 130 may rotate with respect to the side support 116 such that the wheel 136 of the front suspension unit 130 translates in a generally rearward direction.

Figure 10:
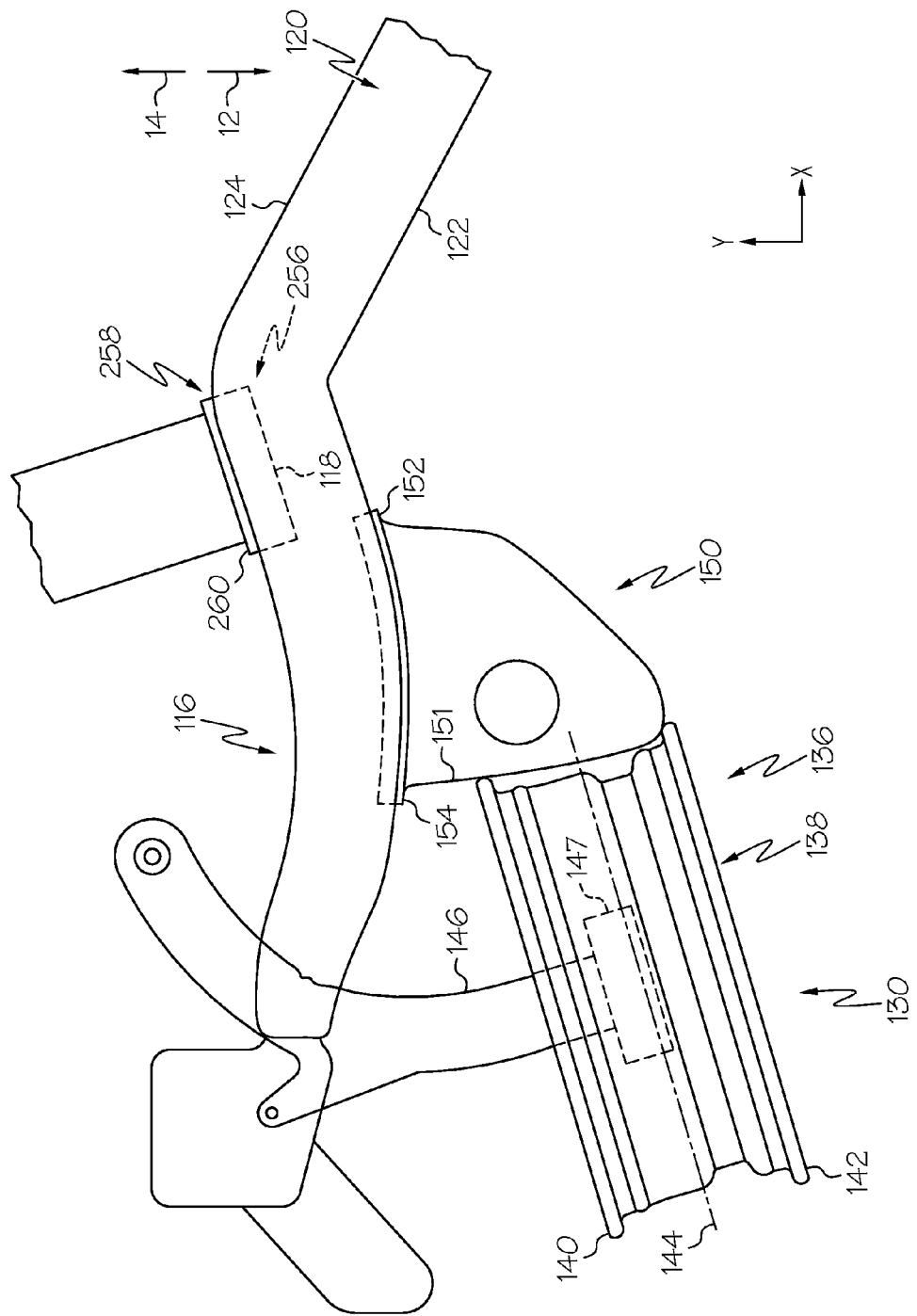
FIG. 10 schematically depicts a top view of a targeted energy absorption portion under deformation according to one or more of the embodiments shown or described herein.

During a small front bumper overlap collision in which portions of the energy dissipation features of the vehicle 100 are not activated, energy associated with the collision may be introduced into the surrounding vehicle structures. Referring to FIGS. 9 and 10, the barrier that makes contact with the vehicle 100 may translate rearward relative towards the vehicle 100. The barrier may direct energy from the collision into the components of the front suspension unit 130. The barrier may direct energy into the wheel 136 of the front suspension unit 130. The wheel 136 of the front suspension unit 130 may translate rearward as a result of the energy introduced by the barrier to the vehicle 100. The wheel 136 may impact the forward end portion 151 of the cab mounting bracket 150. As the wheel 136 impacts the forward end portion 151 of the cab mounting bracket 150, the wheel 136 introduces a force to the cab mounting bracket 150 in a rearward direction. Because the cab mounting bracket 150 is coupled to the side support 116 at an inward position from the application of force from the wheel 136, the force applied by the wheel 136 may tend to rotate the cab mounting bracket 150 about its attachment point. The cab mounting bracket 150 may rotate with respect to the side support 116, whereby the rearward attachment position 152 of the cab mounting bracket 150 translates inward (i.e., in the +Y-direction depicted in FIGS. 6 and 7). As the rearward attachment position 152 translates inward, the rearward attachment position 152 directs energy of the collision into the targeted energy absorption portion 156 at a position proximate to the forward wall portion 162 of the interior reinforcement member 160. The forward wall portion 162 of the interior reinforcement member 160, therefore, may increases a buckling resistance of the side support 116 in the vehicle lateral direction (i.e., in the +/−Y direction depicted in FIGS. 6 and 7) by increasing the load handling capability of the side support 116 from energy associated with a small front bumper overlap collision. Energy of the collision may be directed in an inboard direction from the side support 116 at a position proximate to the rearward attachment position 152 of the cab mounting bracket.

Because the forward wall portion 162 of the interior reinforcement member 160 increases the buckling resistance of the side support, the interior reinforcement member 160 increases the amount of energy that may be absorbed and/or directed by the side support 116 caused by the cab mounting bracket 150 rotating into the side support 116. Further, the increased cross-section portion 258 is positioned along the side support 116 and may supplement the strength and/or stiffness of the side support 116 at positions proximate to the reinforcement member 260. The side support 116, therefore, may have increased energy absorption capacity at positions proximate to the increased cross-section portion 258. Energy introduced to the side support 116 by the cab mounting bracket 150, therefore, may be transferred to the reinforcement member 260 so that the energy may be dissipated or selectively directed to additional vehicle structures. Additionally, because the cab mounting bracket 150 may be used to couple the cabin 108 to the frame 110 in vehicles using a body-on-frame construction technique, an increase in the amount of energy that may be absorbed by the side support 116 may assist in preventing the cabin 108 from separating from the cab mounting bracket 150, and, therefore, the frame 110 of the vehicle 100.

Because the increased cross-section portion 258 selectively increases the buckling resistance of the side support 116, the increased cross-section portion 258 increases the amount of energy that may be absorbed by the side support 116 as the cab mounting bracket 150 rotates into the side support 116 as compared to a side support that does not include the increased cross-section portion 258. Because the cab mounting bracket 150 may be used to couple the cabin 108 to the frame 110 in embodiments of the vehicle 100 that incorporate body-on-frame construction techniques, increasing the energy that may be absorbed by the side support 116 may assist in preventing the cabin 108 from separating from the cab mounting bracket 150, and, therefore, the frame 110 of the vehicle 100.

Further, by incorporating a cab mounting bracket 150 into the frame 110 in which the cab mounting bracket 150 extends to a position outboard of the centerline 144 of the rim 138 of the front suspension unit 130. The outboard position to which the cab mounting bracket 150 extends may increase the likelihood of contact between the wheel 136 and the forward end portion 151 of the cab mounting bracket 150. Further, the wheel 136 may exhibit its greatest resistance to crushing at a location proximate to the hub mount 147. By including a cab mounting bracket 150 that extends to an outboard position proximate to the hub mount 147, energy from a small front bumper overlap collision can be transferred in a position that generally corresponds to the hub mount 147 and into the forward end portion 151 of the cab mounting bracket 150. By transferring the energy associated with the collision at a position that generally corresponds to the position of the hub mount 147, the energy of the collision may be conveyed through the wheel 136 and into the designated support structure of the vehicle 100. Further, by incorporating a cab mounting bracket 150 that extends to an outboard position proximate to the hub mount 147, including extending to a position outboard of the rim centerline 144, a significant portion of the wheel 136 will likely contact the forward end portion 151 of the cab mounting bracket 150 in a small front bumper overlap collision in which the wheel 136 is driven rearward by the collision. By increasing the positional overlap between the wheel 136 and the cab mounting bracket 150, the likelihood of energy associated with the collision being transferred back to the cab mounting bracket 150 increases.

It should now be understood that vehicle according to the present disclosure may include a side support that extends in a vehicle longitudinal direction between a front suspension mount and a rear suspension mount of the vehicle, and a cab mounting bracket that is coupled to the side support and extends outward in a vehicle lateral direction from the side support. The side support may include a targeted energy absorption portion that defines a high-strength region of the side support that is positioned proximate to a rearward attachment position of the cab mounting bracket on the side support. In the event of a collision in which energy is transferred through a suspension unit of the vehicle, the suspension unit may impact the cab mounting bracket, which may direct the energy of the collision into the side support of the frame. The high-strength region of the side support may increase the amount of energy that may be absorbed by the side support.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
 a side support extending in a vehicle longitudinal direction between a front suspension mount and a rear suspension mount of the vehicle, the side support comprising:
  a reduced cross-section portion positioned on an outward vehicle lateral direction-facing surface;
  a targeted energy absorption portion comprising an interior reinforcement member positioned at least partially inside the side support proximate to the reduced cross-section portion, the targeted energy absorption portion positioned between the front suspension mount and the rear suspension mount of the vehicle, wherein the targeted energy absorption portion defines a high-strength region of the side support;
 a cab mounting bracket coupled to the side support and extending outward in a vehicle lateral direction from the side support, wherein the cab mounting bracket comprises a rearward attachment position on the side support, and the rearward attachment position of the cab mounting bracket is positioned proximate to the high-strength region of the side support; and
 a wheel assembly coupled to the front suspension mount and positioned forward of the cab mounting bracket in the vehicle longitudinal direction.

2. The vehicle of claim 1, further comprising a front suspension unit coupled to the front suspension mount of the side support.

3. The vehicle of claim 1, wherein the interior reinforcement member comprises a forward wall portion that extends in the vehicle lateral direction to increase a buckling resistance of the side support in the vehicle lateral direction.

4. The vehicle of claim 3, wherein the rearward attachment position of the cab mounting bracket is within about 30 mm of the forward wall portion of the interior reinforcement member as evaluated in the vehicle longitudinal direction.

5. The vehicle of claim 3, wherein the interior reinforcement member further comprises an interior wall portion and an exterior wall portion that are oriented in a direction that is perpendicular to the forward wall portion.

6. The vehicle of claim 1, further comprising a first exterior reinforcement member positioned proximate to the reduced cross-section portion and coupled to the side support at a position outboard from the interior reinforcement member in the vehicle lateral direction.

7. The vehicle of claim 6, further comprising a second exterior reinforcement member positioned proximate to the reduced cross-section portion and coupled to the side support at a position outboard from the interior reinforcement member in the vehicle lateral direction.

8. The vehicle of claim 6, wherein the first exterior reinforcement member is coupled to an upper corner and a lower corner of the reduced cross-section portion, and the first exterior reinforcement member is detached from the side support at a position between the upper corner and the lower corner of the reduced cross-section portion.

9. The vehicle of claim 1, wherein the targeted energy absorption portion of the side support comprises an increased cross-section portion positioned on an inward vehicle lateral direction-facing surface of the side support.

10. The vehicle of claim 9, wherein the increased cross-section portion comprises a reinforcement member positioned on the inward vehicle lateral direction-facing surface of the side support.

11. The vehicle of claim 9, wherein the rearward attachment position of the cab mounting bracket is positioned proximate to the increased cross-section portion of the side support.

12. A vehicle comprising:
 a side support extending in a vehicle longitudinal direction between a front suspension mount and a rear suspension mount of the vehicle, the side support comprising a targeted energy absorption portion that is positioned between the front suspension mount and the rear suspension mount of the vehicle, wherein the targeted energy absorption portion defines a high-strength region of the side support;
 a front suspension unit coupled to the front suspension mount, the front suspension unit comprising a rim having an inner flange and an outer flange opposing the inner flange and a centerline positioned between the inner flange and the outer flange bisecting the rim;
 a cab mounting bracket coupled to the side support, the cab mounting bracket extending outward from the side support in a vehicle lateral direction such that at least a portion of the cab mounting bracket extends beyond the centerline of the rim in the vehicle lateral direction; wherein:

the cab mounting bracket comprises a rearward attachment position on the side support, and the rearward attachment position of the cab mounting bracket is positioned proximate to the high-strength region of the side support; and the rim of the front suspension unit is positioned forward of the cab mounting bracket in the vehicle longitudinal direction.

13. The vehicle of claim 12, further comprising an interior reinforcement member positioned at least partially inside the side support and coupled to the side support, wherein the interior reinforcement member comprises a forward wall portion that extends in the vehicle lateral direction to increase a buckling resistance of the side support in the vehicle lateral direction.

14. The vehicle of claim 13, wherein the side support comprises a reduced cross-section portion positioned on an outward vehicle lateral direction-facing surface of the side support proximate to the targeted energy absorption portion, and the interior reinforcement member is positioned at least partially inside the side support at a position proximate to the reduced cross-section portion.

15. The vehicle of claim 14, wherein the rearward attachment position of the cab mounting bracket is within about 30 mm of the forward wall portion of the interior reinforcement member as evaluated in the vehicle longitudinal direction.

16. The vehicle of claim 14, further comprising an exterior reinforcement member positioned proximate to the reduced cross-section portion and coupled to the side support at a position outboard from the interior reinforcement member in the vehicle lateral direction.

17. The vehicle of claim 16, wherein the exterior reinforcement member is coupled to an upper corner and a lower corner of the reduced cross-section portion, and the exterior reinforcement member is detached from the side support at a position between the upper corner and the lower corner of the reduced cross-section portion.

18. The vehicle of claim 12, wherein the targeted energy absorption portion of the side support comprises an increased cross-section portion positioned on an inward vehicle lateral direction-facing surface of the side support.

19. The vehicle of claim 18, wherein the increased cross-section portion comprises a reinforcement member positioned on the inward vehicle lateral direction-facing surface of the side support.

20. The vehicle of claim 18, wherein the rearward attachment position of the cab mounting bracket is positioned proximate to the increased cross-section portion of the side support.

* * * * *